Aug. 3, 1965 F. TRAINA 3,198,753
CATALYST COMPOSITION CONSISTING OF THE OXIDES
OF MOLYBDENUM, IRON AND COBALT
Filed March 20, 1961
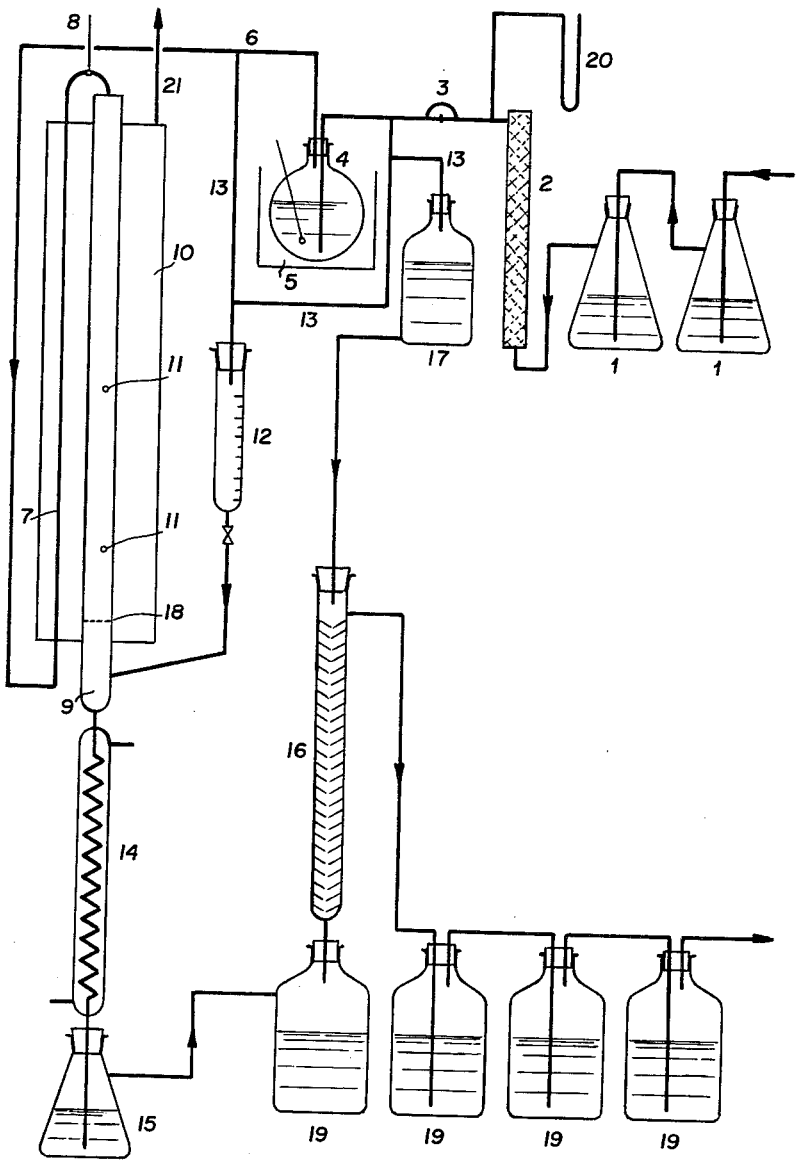
INVENTOR.
Francesco Traina

United States Patent Office 3,198,753
Patented Aug. 3, 1965

3,198,753
CATALYST COMPOSITION CONSISTING OF THE OXIDES OF MOLYBDENUM, IRON AND COBALT
Francesco Traina, Novara, Italy, assignor to Montecatini Società Generale per l'Industria Mineraria e Chimica, a corporation of Italy
Filed Mar. 20, 1961, Ser. No. 96,824
Claims priority, application Italy, Mar. 22, 1960, 4,961/60
2 Claims. (Cl. 252—470)

My invention relates to the preparation of a catalyst comprising molybdic anhydride (molybdenum oxide), iron oxide and cobalt oxide for oxidizing methanol to formaldehyde, and its process of use.

Molybdic anhydride has been used as a catalyst in the oxidation of methanol to formaldehyde for a long time. The known molybdenum catalysts, however, have the disadvantage that they crumble and cause excessive formation of powder, with all the dangerous consequences deriving therefrom. The high brittleness of these catalysts also rendered necessary their preparation at their place of use, in order to avoid crumbling in transportation.

In order to avoid these disadvantages and inconveniences, recourse has recently been had to the system of preparing a non-active pre-catalyst, having a higher mechanical strength, which can be transported. The pre-catalyst was then activated in the methanol converter. This improvement has, however, a very limited advantage because said pre-catalyst loses a part of its initial mechanical strength during said activation. Moreover, during the process of oxidizing methanol the crumbling phenomenon, arising from the decreased mechanical strength, increases the pressure drop to such an extent that the catalyst must be removed from the reactor after a working period which does not exceed 60 days. Reference is made to U.S. Patent No. 2,812,309 in this relation.

Molybdic anhydride catalysts, however, give rather low conversion yields, i.e. about 40%. It is also known that in order to obtain high conversions (about 90%) molybdic anhydride is used in admixture with one or more of the oxides of iron, lanthanum, thorium, neodymium, zinc, tin, vanadium, tungsten, cerium and samarium.

Application Serial No. 846,791, filed October 16, 1959, now Patent No. 3,152,997, discloses a method of preparation of a molybdenum oxide-iron oxide catalyst and the use thereof for the production of formaldehyde from methanol. The disclosure thereof is incorporated by reference.

An object of the present invention is to produce a superior molybdic anhydride catalyst for the production of formaldehyde from methanol.

A further object of the invention is to increase the formaldehyde yields from methanol oxidation.

I have now found a catalyst on the basis of molybdic anhydride and iron oxide provided with high activity, selectivity and productivity, in which cobalt oxide is present in percentages within a narrow range.

The presence of cobalt increases the activity of the corresponding binary catalyst comprising molybdenum and iron and remarkably increases the formaldehyde yields. The catalyst according to the present invention has also very good physical properties: regular and uniform granulometry, small pieces and high mechanical strength. The above properties are essential factors for the best catalytic yields.

The catalyst is prepared in the form of equidimensional granules, for instance small cylinders whose height is equal to their diameter. This fact not only permits the regular distribution of the reacting gases in the catalytic mass itself, but also makes it possible to reduce the pressure drops and their increase in time. In their turn, the low pressure drops permit the use of small granules, e.g. 3–4 mm., which make it possible to use tubes having small diameters, e.g. 15 mm., in the construction of the reactor. This in turn gives the remarkable advantage of realizing high ratios between the surface of the tubes and the volume of the catalyst and, therefore, an effective thermal control of the reaction, thus obtaining advantages both in the efficiency of the reactors and in the reaction yields.

The catalyst of the instant invention has an average breaking load under compression not less than 7 kg. for a cylindric granule having a height and a diameter of 3.5 mm. The high mechanical strength of the carrier-free catalyst allows its delivery at great distances and does not limit the height of filling of the reactor tubes. This was not possible with previously known catalysts since they crush.

Another object of the present invention is to provide a catalyst that is always ready for use and does not require activation in the methanol reactor.

Activation is carried out during the preparation of the catalyst by a progressive thermal treatment and according to a very well defined temperature-time diagram. The high activation temperature insures the catalyst strength to the thermal stresses to which it is subjected in the reactor.

Another object of the invention is to provide a catalyst with high yields from the reagents employed in its manufacture, i.e. molybdenum, iron and cobalt salts.

The new catalyst consists of 78–81% $MoO_3$, 15.5–17.5% $Fe_2O_3$, 1.2–2.6% Co. The weight ratio Mo/Fe in the finished product is between 4.2 and 4.8 and the final weight ratio Mo/Co is between 20.0 and 45.0. The preferred composition has a weight ratio Mo/Fe of 4.25–4.6 and a weight ratio Mo/Co of 20–30.

If the catalyst contains less than 1.2% Co, the weight ratio Mo/Co is greater than 45, the influence of the Co is null and the activity of the ternary catalyst is equal to that of the corresponding binary compound Mo/Fe. If the catalyst, however, contains more than 2.6% Co, the weight ratio Mo/Co is less than 20, the influence of Co becomes negative and the resulting catalysts give conversions of methanol to formaldehyde yields less than those obtained with the binary Mo-Fe catalysts. The cobalt, therefore, has a specified catalytic action on the oxidation of the methanol to formaldehyde, provided that it is mixed under suitable concentrations with the molybdic anhydride and the iron oxide.

In U.S. Patent No. 2,812,309, the element cobalt has been regarded as a non-harmful impurity when it is contained in amounts less than 0.001%. Said patent, however, did not attribute any catalytic activity to the cobalt.

The catalyst shows tolerance to impurities. I have determined that the Co-activated catalyst is insensible to the presence of Al and Mg even when their content amounts to 0.3% each, to the presence of Cr and Si in amounts of 0.1% each, and to the presence of Ca in amounts of 0.3%. The activated Co catalyst shows a very high degree of crystallinity under X-ray examination, whereas the previously known catalysts show an amorphous structure or at most a structure at hte boundary between crystalline and amorphous.

The drawing is a schematic diagram of a methanol converter in which our catalyst is used.

The preparation of the catalyst, according to my invention, consists essentially in adding the optimum amount of cobalt oxide, as such, or as hydroxide or salt, to an iron molybdate precipitate. The preferred mixture is that of the iron molybdates and cobalt molybdates. The preparation of the catalyst according to the invention also differs from known methods because of the particular mechanical treatment and the high activation temperature.

The process substantially comprises a certain number of interdependent operations having complementary effects which are:

(a) Precipitation of iron molybdate from diluted solutions of molybdates and iron salts;

(b) Washing the precipitate in order to remove the soluble salts formed in the reaction between molybdates and iron salts;

(c) Drying the filtered precipitate until the water content is reduced to 40–50%, preferably to 45–47%, by weight;

(d) Precipitation of cobalt molybdate from dilute solutions of molybdates and cobalt salts, or precipitation of another cobaltous compound;

(e) Washing the precipitate in order to remove soluble salts formed in the reaction between the cobalt salts and the molybdates, or between cobalt salts and another precipitating agent;

(f) Drying the washed and filtered precipitate obtained according to (e) to reduce its water content to 40–60% by weight;

(g) Mixing by plastic processing, e.g. roll milling, of the two dried cakes of (c) and (f);

(h) Shaping the catalyst into regular equidimensional granules, such as small cylinders having a height equal to the diameter;

(i) Gradual drying at temperatures progressively increasing up to 120° C., according to a temperature-time diagram of the type specified in Example 1;

(j) Activation of the dried catalyst by thermal treatment at a temperature gradually increasing up to a maximum of 450° C. and according to a time-temperature diagram of the type specified in Example 1.

None of the listed operations can be omitted or varied beyond the limits specified without prejudicing the final results. The following considerations demonstrate that what we have stated above:

(1) The hydrated molybdenum and iron oxides must be precipitated together since the separate precipitation and their subsequent mechanical mixing lead to catalysts which are not selective. The hydrated cobalt oxide, however, may be precipitated either together with the hydrated molybdenum oxide or separately and then mechanically mixed with the hydrated molybdenum and iron oxides.

(2) An insufficient washing of the mixture of the hydrated Mo and Fe oxides and an insufficient washing of the cobaltous precipitate leave in the catalyst some foreign components which damage its activity and selectivity, or even the mechanical strength if they are decomposed by thermal effect.

(3) An excessively high water content, namely, higher than 50% in the precipitated iron molybdate cake, or higher than 60% in the cobaltous cake hinders good plastic processing of the two cakes. In the absence of said plastic processing, the catalyst shaping does not take place well, and during the following processing the catalyst crumbles down or, at least, remains friable.

(4) The catalyst cannot be suitably activated if it is not previously subjected to a slow drying since the quick temperature variation causes cracking and crumbling of the catalyst.

The precipitation of iron molybdates, as at the point (a), is carried out by mixing a molybdate solution, e.g., ammonium heptamolybdate, with a solution of an iron salt, e.g., ferric chloride. In order to obtain an iron molybdate precipitate having the desired composition with high yields with respect to the molybdenum used, it is necessary that the atomic ratio Mo/Fe in the reagents used be between 2.62 and 2.73. The concentration of the two solutions should be kept at about 5%, since lower concentrations result in a lower yield of precipitate, and higher concentrations result in precipitates that are scarcely homogeneous. The precipitation is carried out at 50–60° C. while vigorously stirring, by mixing a hot solution of molybdate with a room temperature solution of an iron salt. The ferric solution may be hydrolyzed by heating, and said hydrolyzation has to be avoided.

I prefer to use aqueous ammonium molybdate and ferric chloride solutions since in this case it is unnecessary to correct their pH. This fact offers a remarkable advantage. If, however, the ammonium molybdate solution was previously acidified in order to adjust its pH to near that of the ferric solution, the precipitation would occur well, but it would be necessary to increase or to prolong the washing since the amounts of the extraneous components increase. This fact would result in a higher molybdenum loss and a change of the catalyst composition and therefore in a decrease of the catalyst activity.

The washing of the iron molybdates (point b) is carried out so as to remove most of the soluble salts formed in the reaction between the molybdate and the iron salt. If the soluble salt which has to be removed is a chloride, the precipitate is washed until its chlorine content becomes less than 0.13 g./100 g. Mo.

The preliminary drying or the calendering (point c) of the precipitated and washed iron molybdates is necessary in order to make efficient the subsequent mechanical treatment of plastic processing mentioned at point g. As a result of the drying or the calendering, the water content of the cake is reduced to 40–50% and preferably 45–47% of the cake weight.

The precipitation of the cobalt molybdate (point d) is carried out by mixing the aqueous solution of a molybdate with a hot aqueous solution of a cobalt salt and adjusting the pH of the resulting mixture to a value between 5.6 and 5.8. For instance, ammonium heptamolybdate, cobalt chloride and ammonia solutions may be used. In order to obtain a cobalt molydate precipitate having the desired composition and high yields on the basis of the molybdenum and cobalt used, it is necessary that the atomic Mo/Co ratio in the reagents used to be equal to 1. The concentration of the solutions has to be kept at about 8%, for the ammonium heptamolybdate, at about 30% for the cobalt chloride and 10% for the ammonia. Too dilute solutions give a lower yield of cobalt molybdate. Similarly, when hot mixture of the two solutions is not boiled and kept at boiling temperature for some minutes, too low yields of precipitation are obtained.

The washing of the cobalt molybdate (point e) is carried out with the same washing procedures as that of the iron molybdates, in order to remove most of the soluble salts formed in the reaction between the molybdate and the cobalt salt. When the soluble salt to be removed is a chloride, it is advisable to wash the cake until its chlorine content decreases to 0.13 g./100 g. Mo.

The drying (point f) may be skipped when the precipitated and filtered Co-molybdate has a water content between 40 and 60% of its weight. Alternatively, the drying may be carried out carefully so that the precipitate is completely dried. In the latter case, the cake will have the composition $CoMoO_4 \cdot H_2O$.

In this case, the successive mixing (point g) will be carried out between iron molybdates having a 40–50% by weight moisture and the cobalt molybdate wholly dried. This procedure does not vary either the working conditions (point g) and the steps following, or the characteristics of the finished product.

When cobaltous hydroxide is used instead of cobalt molybdate, the former is precipitated according to one of the conventional methods. An alkali medium is added to a soluble cobalt salt. The precipitate is then washed and eventually dried or at least dehydrated so that the cake contains at least 30% of dried solid. The mechanical treatment, of plastic processing, to which the mixture of the iron and cobalt molybdates, or the mixture of iron and other cobalt salts, or the mixture of the iron molybdates and hydrated cobalt oxide, is subjected results in increasing the cohesion between the solid particles of the mixture which, therefore, acquires a greater mechanical strength.

The mechanical treatment is carried out by repeatedly passing the mixture of the dried precipitates through the rolls of a roll mill or calender until the granules or crumbs are transformed into sheets.

The shaping of the catalyst (point $h$) is carried out in a suitable extruder. The extruder may consist, for instance, of a roll mill provided with bored rolls or of a commonly used extruder. Both the roll mill and the extruder are provided with a cutter. The catalyst is preferably prepared in equidimensional granules, for instance small cylinders having diameter and height of 4.2 mm.

The use of small equidimensional granules, which have been dimensionally stabilized by the above-mentioned mechanical treatment of plastic processing, makes possible an easy and homogeneous filling of the tubes of the reactor even when the tubes have small diameter, e.g. 15 mm. This results in the advantages of producing a homogeneous and uniform catalytic bed and of better removal of the heat of reaction.

The drying (point $i$) is carried out by air and the particular conditions of graduality are followed. In a first stage, the catalyst is kept at room temperature until a surface dried film is formed which prevents the adhesion of the granules to each other. The catalyst is then dried by air at temperatures increasing up to 120° C., so that the gradual contraction of the granules is favored without promoting crumbling and cracking. In this manner a nearly perfectly dried end product is obtained.

The activation (point $j$) follows a rule similar to that of the drying according to which the temperatures are gradually increased from 120° to 400–450° C. within a period of time not less than 4 hours. The catalyst is then kept at the final temperature for at least another 4 hours. If the final roasting temperature is less than about 400° C. or higher than about 450° C., the the final activity of the catalyst is substantially lowered.

The activation process according to the present invention differs greatly from the procedures previously used, in which the activation is carried out in the methanol reactor before or simultaneously with the feeding of the catalyst.

As a result of the thermal catalytic activation of the present invention, the catalyst granules are subjected to a further contraction and acquire that final mechanical strength through which the catalyst may be handled and delivered without danger of crumbling and formation of powder.

When in the process hereinabove described the steps which relates to the addition of Co are eliminated, a binary catalyst based on iron and molybdenum oxide is obtained, which has the same physical properties of the corresponding ternary compound.

Between the two catalysts, the ternary catalyst has higher catalytic properties when it contains from 1.2 to 2.6% of Co. lower catalytic properties when it contains more than 2.6% Co, and equal catalytic properties when it contains less than 1.2% Co.

In the drawing, the reactor consists of a vertical stainless steel tube 1 m. high and having an inner diameter of 15 mm. (9) heated by means of a jacket 80 cm. high (10) containing oil or boiling diphenylamine (M.P. 53° C., B.P. 303° C.) with outlet (21). A stainless steel tube having an inner diameter of 8 mm. (7), which acts as pre-heater, passes through the jacket. Air coming from a cylinder or from the outdoors (we have found no difference between the two cases) is dried through two bottles containing concentrate sulfuric acid 1 and a calcium chloride column 2 adjusted by means of a flowmeter 3 and saturated with methanol 4 by keeping the temperature constant by means of the bath 5. The methanol-air mixture, leaving by outlet (6) and after having passed through the pre-heater, enters the reactor from the top. A thermometer 8 shows the temperature at the inlet, while the thermocouples 11 show the temperature on the upper and lower surface of the catalyst. The catalyst is placed on a thin layer of stainless steel granules which are supported by a stainless steel grid 18. The grid is provided with a shank welded to a drilled plug which screws on the bottom of the reactor. The gas mixture, after having crossed the catalyst, is contacted under the grid with a thin water flow coming from the dosimeter 12, goes to the cooler 14 and to the bottle 15 filled with water. Then, there is a small countercurrent mixing column 16 fed with water coming from the dosimeter 17. The absorbers 19 fix the last traces of gas. In the latter of said absorbers, formaldehyde is generally absent. The residual air is conveyed to a meter. The water dosimeters 12 and 17 are connected to the apparatus by means of pressure control devices 13 whilst the mercury gauge 20 measures the air pressure at the upstream of the flowmeter.

In order to illustrate, but not to limit, the invention, the following examples are given.

In all the examples, I first describe the preparation of the catalyst and then the working characteristics. Examples 1–4 and Examples 7–8 relate to catalysts containing Co percentages varying within 1.2 and 2.6%.

Examples 5–6 and 9 relate to catalysts containing respectively lower and higher Co percentages. Examples 1–3, more particularly, relate to the optimum composition of the catalyst containing 2.25–2.4% Co. For comparison, the preparation and the working characteristics of the binary catalyst molybdenum oxide-iron oxide used as base catalyst in the preparation of the ternary catalysts of the preceding examples are given in Example 10.

EXAMPLE 1

(I) 12.67 g. ammonium heptamolybdate

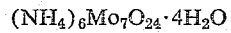

$(NH_4)_6Mo_7O_{24} \cdot 4H_2O$ are dissolved in 150 cc. water and the solution is heated at 70° C. A boiling cobalt chloride solution already prepared from 17.07 g. $CoCl_2 \cdot 6H_2O$ (pure of analysis) and 54 cc. cold water is added. While stirring the solution, 19 cc. of a 10% by weight ammonia solution are added to give a pH value between 5.6 and 5.8. The resulting mixture is heated up to the boiling temperature. A violet precipitate is obtained, which is filtered under vacuum at 200 mm. Hg of absolute pressure. The cake is pulped again in 100 cc. water and is filtered again as mentioned above. The washing operation is again repeated and finally a moist cake of Co molybdate containing 1.4 parts water per part of dried solid is obtained.

(II) Separately, 200 g. pure ammonium heptamolybdate containing 81% $MoO_3$ are dissolved in 4 l. water, and the resulting solution is heated at 60° C. A solution of 110 g. hexahydrate ferric chloride in 2.2 l. water already prepared and kept at room temperature is gradually added to the first solution while stirring. A yellow iron molybdate precipitate is obtained, which is filtered under vacuum at 300 mm. Hg of absolute pressure. The cake is pulped again in 3.3 l. water and 2.5 l. wash water is removed by decantation. Said operation is twice repeated so that a total of 9.9 l. wash water is used. The washed cake is filtered under vacuum at 150 mm. Hg absolute pressure, and then is pressed and dried so that the resulting cake contains from 0.8 to 0.9 part water per 1.0 part of dried solid.

(III) The two cakes, i.e. the cake of iron molybdate and the one of cobalt molybdate, are broken, mixed together and transformed into sheets having a homogeneous composition by successive passages through a granite roll mill whose rolls rotate at different speeds. The ratio between the two speeds is within 1.4 and 1.6. The product, thus treated, is then extruded through an extruder having circular holes and is cut at the extruder end by means of a rotating cutter. The catalyst, at this stage of the processing is in form of small cylinders having diameter and height of 4.2 mm.

The mass is then dried in an air stream for 6 hours at room temperature (15–30° C.), for 12 hours at 40° C., 6 hours at 60° C. and 6 hours at 120° C. Finally, the catalyst is activated by thermal treatment at increasing temperatures, specifically at 150° C. for 2 hours, at 200–250–300° C. respectively for 1 hour, and at 420° C. for 5 hours. Corresponding to each of the activation temperatures the catalyst loses progressively 5.0–5.5–5.8–6.2–6.5% of its initial weight. During the drying and the activation steps, the small cylinders undergo a contraction which results in a reduction of diameter and height to 3.5 mm.

178 g. finished catalyst are obtained, corresponding to 1.03 parts of catalyst for 1 part of molybdic anhydride used. The catalyst contains 52% Mo, 12.2% Fe, 2.35% Co.

Tests were carried out using the catalyst as prepared above in the apparatus described in the drawing.

(1a) 28 g. catalyst are introduced in the reactor. The thermostatic bath is kept at a temperature of 303° C. The catalyst occupies a 25 cc. volume in the tube. A gaseous pre-heated methanol-air mixture containing 5.5% by volume $CH_3OH$, at a spatial velocity of 9.9 Nl./h./cc. of catalyst is passed over the catalyst. The reaction products are drowned in water as shown in the schematic diagram herewith enclosed. 86.50 g. 100% formaldehyde per 100 g. anhydrous methanol employed are obtained with a yield of 92.3% of the theoretical value. 1.4 g. anhydrous unconverted methanol and 0.015 g. formic acid are found together with the formaldehyde while other by-products are not found.

The symbol N means at standard conditions. The symbol Nl, therefore, means liters of gas calculated at 0° C. and 760 mm. of Hg pressure.

(1b) When the gaseous mixture of (1a) is passed over the catalyst at a spatial velocity of 21.4 Nl./h./cc. and the other working conditions are unchanged, the same yield of formaldehyde and composition of the reaction product are obtained.

(1c) When the gaseous-mixture of (1a) is passed over the catalyst at a spatial velocity of 15 Nl./h./cc. of catalyst, the other working conditions being unchanged, 87.38 g. 100% formaldehyde per 100 g. anhydrous methanol used are obtained. This corresponds to a conversion yield, of methanol to formaldehyde of 93.2% of the theoretical value. 1.0 g. anhydrous unconverted methanol and 0.02 g. formic acid are correspondingly obtained as by-products, while other by-products are practically not found.

(1d) When a pre-heated gaseous mixture consisting of air and methanol, containing 6% by volume of $CH_3OH$, is charged to the catalyst at a space velocity of 9 Nl./h./cc., a formaldehyde yield equal to 92.4% of the theoretical value is obtained. The actual products obtained are 86.62 g. formaldehyde, 1.6 g. anhydrous unconverted methanol and 0.018 g. formic acid per 100 g. of methanol used. Other by-products are substantially excluded.

*Example 2*

An iron molybdate precipitate is prepared, washed, filtered and dried in the manner described in part II of Example 1 until a cake containing 0.85 part of water per part of dried solid is obtained. 98 g. of the solid, corresponding to 26.88 g. Mo and 6.44 g. Fe are mixed with 5 g. pure dried cobalt molybdate ($CoMoO_4 \cdot H_2O$). The mixture undergoes a mechanical treatment of plastic processing and the successive forming, drying and roasting operations as described in part III of Example 1. 54.6 g. finished catalyst, containing 52.9% Mo, 11.8 Fe, and 2.27% Co, are obtained.

The following examples using the catalyst illustrate that the catalyst thus prepared gives the same reaction yields as the catalyst of Example 1.

Tests were carried out using the same apparatus of Example 1 and with an equal volume of working catalyst, i.e., 25 cc. catalyst. 29 g. catalyst were sufficient in order to obtain said volume. The results of the tests are hereinafter listed, one each in correspondence to the operative conditions.

In the tests 2e and 2f, an oil bath was used instead of a thermostatic diphenylamine bath.

| No. | Temp., ° C. | Spatial velocity, Nl./h./cc. | $CH_3OH$ in the feed. gas, percent by volume | Products obtained from 100 g. $CH_3OH$ | | | Yield, percent $CH_2O$ |
|---|---|---|---|---|---|---|---|
| | | | | $CH_2O$, g. | $CH_3OH$, g. | HCOOH, g. | |
| 2a | 303 | 7.0 | 6.3 | 86.25 | 1.30 | 0.13 | 92.0 |
| 2b | 303 | 14.0 | 6.3 | 85.32 | 2.20 | 0.020 | 91.0 |
| 2c | 303 | 21.4 | 5.8 | 86.25 | 2.00 | 0.023 | 92.0 |
| 2d | 303 | 9.4 | 5.8 | 85.78 | 1.60 | 0.017 | 91.5 |
| 2e | 280 | 4.0–7.0 | 6.3 | | | | 91.6 |
| 2f | 280 | 5.0–8.0 | 5.5 | | | | 92.3 |

Comparison of the Examples 2a to 2d and Examples 2e to 2f demonstrates that the activity of the catalyst according to the invention, based on Mo–Fe–Co, is not closely limited to a certain temperature and that yields remain constant within certain limits, to which the working operations of an industrial plant may vary.

*Example 3*

A precipitate of iron molybdates is prepared, washed, filtered, dried as described in part II of Example 1 until a cake containing 0.85 part of water per part of dried solid is obtained. 98 g. of said cake, corresponding to 26.88 g. Mo and 6.44 g. Fe are mixed with 6.5 g. cobalt hydroxide in form of a paste containing 30% $Co(OH)_2$.

The cobalt hydroxide has been precipitated from a cobalt chloride solution containing 18% $CoCl_2$, by an aqueous 20% ammonia solution. The filtered precipitate has been washed by decantation until soluble salts are no longer present, and then it has been filtered again under vacuum at 200 mm. Hg absolute pressure. The mixture consisting of the iron molybdates and cobalt hydroxide is mechanically processed, extruded, dried and activated by roasting as in the case of the mixture consisting of iron molybdates and cobalt molybdates of part III of Example 1. 51.7 g. finished product containing 51.9% Mo, 12.3% Fe, and 2.39% Co are obtained.

28 g. of the catalyst prepared according to the present example when introduced in the reactor tube surrounded by a thermostatic bath kept at 302° C., occupied a volume of 25 cc. By using a gaseous mixture air-methanol, containing 6% by volume of $CH_3OH$ and at a space velocity of 20 Nl./h./cc. of catalyst, I have obtained 85.3 g. 100% formaldehyde per 100 g. anhydrous methanol fed with a yield of 91% of the theoretical value. 0.02 g. formic acid and 2.0 g. anhydrous methanol have been found as by-products.

Comparison between Example 3 and the foregoing examples demonstrates that, the Co content being equal (2.3–2.4%), the catalyst activity does not depend on the formula of the cobalt compound introduced during the preparation.

EXAMPLE 4

98 g. iron molybdate paste, containing the same amount of water as the preceding example, are mixed with 5.75 g. pure and dried cobalt molybdate ($CoMoO_4 \cdot H_2O$). The finished catalyst, obtained through the usual succession of operations shown in the Examples 1 to 3, weighs 55.3 g. and contains 52.8% Mo, 11.65% Fe, and 2.58% Co.

Tests utilizing the catalysts were carried out in the usual apparatus, on 25 cc. of catalyst (corresponding to 29 g.) by using an air-methanol mixture containing 5.75% by volume of $CH_3OH$.

By comparing the data hereinafter listed

| No. | T., °C. | Spatial vel., Nl./h./cc. | Yield, percent $CH_2O$ |
|---|---|---|---|
| 4a | 280 | 4.5 | 91.5 |
| 4b | 303 | 7.5–9.5 | 92.2 | with the data of the preceding examples it appears that the activity of a catalyst containing 2.6% Co is still comparable to that of catalysts containing 2.3–2.4% Co.

If the percentage of Co in the finished product is further increased, the catalyst activity decreases to the extent that it becomes less effective than the corresponding binary catalyst. This is illustrated in Examples 5 and 6 that follow.

EXAMPLE 5

98 g. iron molybdate paste, containing the same water amount as in Example 3, are mixed with 7.94 g. cobalt hydroxide paste containing 30% $Co(OH)_2$ and prepared according to Example 3. The finished catalyst, treated according to the modalities described in the Examples 1 to 3 weighs 52 g. and contains 51.6% Mo, 12.35% Fe, and 2.9% Co. 25 cc. of said catalyst, corresponding to 28 g., were introduced into the usual reactor tube. A gaseous mixture containing 5.7% $CH_3OH$ by volume was passed through the reactor. The highest yields obtained were 76% of the theoretical value, at 280° C. at a spatial velocity of 4.5 Nl./h./cc. of catalyst (Ex. 5a) and 78% at 302° C. at a spatial velocity of 7.5 Nl./h./cc. of catalyst (Ex. 5b). 71.24 and 73.1 g. 100% formaldehyde per 100 g. anhydrous methanol fed were respectively obtained in Examples 5a and 5b.

EXAMPLE 6

The catalyst was prepared by mixing 98 g. of the usual iron molybdate paste with 7.5 g. pure and dried cobalt molybdate ($CoMoO_4 \cdot H_2O$) and following all the steps of the processing as described in the foregoing examples. The finished product weighed 57 g. and contained 52.5% Mo, 11.3% Fe, and 3.27% Co.

The usual amount of catalyst by weight and volume, used in the usual apparatus, with a gaseous air-methanol mixture containing 5.8% $CH_3OH$ by volume, gave at most, a yield of 62% of the theoretical value both at 280° C. and a spatial velocity of 4.5 Nl./h./cc. (Example 6a) and at 302° C. keeping the spatial velocity at 7 Nl./h./cc. (Example 6b).

When cobalt is added to the iron molybdate in amounts lower than those specified in Examples 1, 2 and 3, the resulting ternary catalysts give always good services and higher than those of the corresponding binary catalyst provided the weight ratio Mo/Co in the finished product is less than 45, and equal when said weight ratio becomes higher. Nevertheless, it is obvious that in this case, it is not useful to use Co.

EXAMPLE 7

98 g. iron molybdate paste, containing 26.88 g. Mo and 6.44 g. Fe, are mixed with 4 g. pure and dried cobalt molybdate ($CoMoO_4 \cdot H_2O$). The processing is carried out as described in the preceding examples until the usual cylindric equidimensional granules activated by roasting at 420° C. are obtained. 53.7 g. finished catalyst containing 53.1% Mo, 12.0% Fe, and 1.85% Co are obtained.

The tests utilizing the catalyst were carried out, as customary, on 25 cc. of catalyst (corresponding to 28 g.). The results are listed hereinafter:

| No. | T., °C. | Spatial vel., Nl./h./cc. | $CH_3OH$ in the feeding gas percent by volume | $CH_2O$, yield percent of theoretical |
|---|---|---|---|---|
| 7a | 280 | 7.5 | 5.75 | 91 |
| 7b | 302 | 9.0 | 5.75 | 92.0 |

EXAMPLE 8

98 g. of the usual employed iron molybdate paste are mixed with 2.53 g. pure and dried cobalt molybdate ($CoMoO_4 \cdot H_2O$) and processed according to the hereinabove described art.

52.3 g. finished catalyst, containing 53.3% Mo, 12.3% Fe, and 1.2% Co are obtained. 25 cc. of said catalyst, corresponding to 28 g., used in the above apparatus, behaved as shown hereinafter:

| No. | T., °C. | Spatial vel., Nl./h./cc. | $CH_3OH$ in the feeding gas percent by volume | $CH_2O$, yield percent of theoretical |
|---|---|---|---|---|
| 8a | 302 | 14.4–20.0 | 6.6 | 89.7 |
| 8b | 280 | 4.9–9.0 | 6.6 | 89.7 |

EXAMPLE 9

98 g. of the usual iron molybdate paste and 1 g. cobalt molybdate are used. The mixture is processed according to the known art and at the end 50.0 g. of finished catalyst are obtained, containing 53.6% Mo, 12.6% Fe, and 0.49% Co.

When 28 g. of said catalyst, corresponding to 25 cc., are used in the above reactor for the methanol, the conversion yields to formaldehyde are not higher than 89% regardless of the way of working.

| No. | T., °C. | Spatial vel., Nl./h./cc. | $CH_3OH$ in the feeding gas percent by volume | $CH_2O$, yield percent of theoretical |
|---|---|---|---|---|
| 9a | 302 | 14.5–21.0 | 6.0 | 89.0 |
| 9b | 280 | 9.0–14.0 | 6.0 | 88.0 |

Under the conditions of this example, and also under the conditions of the preceding examples, I have found small amounts of unconverted methanol and formic acid together with formaldehyde. With the exception of Examples 5 and 6, the amount of methanol was always less than 2.8 parts anhydrous $CH_3OH$ per 100 parts 100% $CH_2O$ and the amount of HCOOH less than 0.03 part/100 parts anhydrous $CH_3OH$.

EXAMPLE 10

A precipitate of iron molybdates, according to the quantitative and qualitative modalities described in Example 1 (part II) is prepared. The precipitate is washed, filtered, and dehydrated until a cake containing 0.85 part of water per 1 part of dried solid is obtained. All the processing steps described in Example I (part III) are then applied and a finished catalyst containing 53.8% Mo and 12.8% Fe is obtained. It is obvious that Co is not present. The steps of Example 1 (part I) were omitted. The catalyst thus obtained weighs 162 g.

The behavior of said catalyst was examined under the same experimental conditions and with the same apparatus used for the Co-containing catalyst.

(10a) The highest conversion yields of methanol to formaldehyde were found within the range of spatial velocities from 14 to 21 Nl./h. gas/cc. catalyst, at an operating temperature of 300° C. Within this range the yields are constantly 89% of the theoretical value whether a gaseous air-methanol mixture containing 5.5% by volume $CH_3OH$ or a richer mixture, i.e. containing up to 6.5% by volume $CH_3OH$, is fed.

(10b) On the other hand, at an operating temperature of 280° C. the highest yields, 88% of the theoretical value, were found within the range of the spatial velocity from 11 to 16. In this case also the yields were constant when the composition of the feeding mixture was varied within the above-mentioned limits.

Example 10 demonstrates the superiority of the ternary catalyst (molybdic anhydride-iron oxide-cobalt oxide) over the binary catalyst (molybdic anhydride-iron oxide) when the Co amount in the former is between 1.2% and 2.6% of the weight of the finished product.

For the purpose of ready comparison, I list, in the following table, the yields obtained with the Co catalysts, as in Examples 1 to 9, and the yields obtained with the catalyst free of Co under the same experimental conditions of the above-mentioned Examples 1 to 9.

| Experimental Conditions of Example | Catalyst with Co | | Catalyst without Co |
|---|---|---|---|
| | Percent Co in catalyst | $CH_2O$, yield percent of theoretical | $CH_2O$, yield percent of theoretical |
| 9a | 0.49 | 89.0 | 89.0 |
| 9b | 0.49 | 88.0 | 87.8–88.0 |
| 8a | 1.20 | 89.7 | 89.0 |
| 8b | 1.20 | 89.7 | 82.5–87.8 |
| 7a | 1.85 | 91.0 | 87.5 |
| 7b | 1.85 | 92.0 | 84.0 |
| 1a | 2.35 | 92.3 | 85.0 |
| 1b | 2.35 | 92.3 | 88.6 |
| 1c | 2.35 | 93.2 | 89.0 |
| 1d | 2.35 | 92.4 | 84.0 |
| 2a | 2.27 | 92.0 | 82.0 |
| 2b | 2.27 | 91.0 | 89.0 |
| 2c | 2.27 | 92.0 | 88.6 |
| 2d | 2.27 | 91.5 | 84.5 |
| 2e | 2.27 | 91.6 | 82.5–87.1 |
| 2f | 2.27 | 92.3 | 85.0–87.7 |
| 3 | 2.39 | 91.0 | 89.0 |
| 4a | 2.58 | 91.5 | 84.0 |
| 4b | 2.58 | 92.2 | 82.5–84.5 |
| 5a | 2.90 | 76.0 | 84.0 |
| 5b | 2.90 | 78.0 | 82.5–84.5 |
| 6a | 3.27 | 62.0 | 80.0 |
| 6b | 3.27 | 62.0 | 87.2 |

What we have referred to, in the above examples, does not limit the importance and the extension of our invention, neither with respect to the preparation of the catalyst nor to its working conditions.

It is advisable to state that the yields of formaldehyde mentioned in our examples are closely connected with the laboratory experimental conditions. In an industrial plant the results are better.

Using a binary catalyst based on molybdic anhydride-iron oxide we could obtain in the laboratory tests yields no higher than 89% (conditions according to Example 10). On the other hand, in the industrial plant, we obtained uninterruptedly for periods higher than one year, average yields of 91.0%. Said yields were obtained by working at a spatial velocity of 6.9 $Nm.^3/h.$ per liter catalyst of the air-methanol mixture containing 6.5% by volume methanol, and having a temperature of 270° C. at the inlet of the catalytic bed and of 330° C. at the outlet. The height of the catalytic bed was 610 mm. The inner diameter of the tubes in the tube bundle was 15 mm. Similarly, for the same period of time, average yields of 90.6% under the same conditions of temperature and methanol concentration of the mixture, at a spatial velocity of 8.9 $Nm.^3/h./l.$ and a catalytic bed height of 485 mm. were obtained.

As the activated Co catalyst has the same physical characteristics in respect to the structure, size, mechanical strength and the same tolerance against the impurities as the simple catalyst based on molybdic anhydride and iron oxide, I have no reason to doubt that in industrial application, its activity will be much higher and the yields will exceed 93%, which yield has been obtained in laboratory (Example 1). For the same reasons, it is probable to expect a catalyst life of not less than 1 year.

I claim:

1. A non-supported active catalyst for the catalytic oxidation of methanol to formaldehyde, consisting of molybdenum oxide, iron oxide and cobalt oxide, the weight ratios of Mo/Fe and Mo/Co in the finished product being respectively between 4.25 and 4.6 and between 20 and 30, and having less than 0.13 g. Cl/100 g. Mo, the granules having a cylindrical shape with a diameter and height of about 3.5 mm.

2. A non-supported active catalyst for the catalytic oxidation of methanol to formalydehyde, consisting of molybdenum oxide, iron oxide and cobalt oxide, the weight ratios of Mo/Fe and Mo/Co in the finished product being respectively between 4.25 and 4.6 and between 20 and 30, and having less than 0.13 g. Cl/100 g. Mo.

References Cited by the Examiner

UNITED STATES PATENTS

| | | | |
|---|---|---|---|
| 1,486,781 | 3/24 | Meigs | 252—470 |
| 1,913,405 | 6/33 | Meharg et al. | 252—470 X |
| 2,111,584 | 3/38 | Eversole | 260—603 |
| 2,369,432 | 2/45 | Byrns | 252—470 X |
| 2,398,919 | 4/46 | Bryns | 252—470 X |
| 2,439,880 | 4/84 | Arnold | 252—467 |
| 2,650,906 | 9/53 | Engel et al. | 252—470 |
| 2,880,171 | 3/59 | Flinn et al. | 252—470 X |
| 2,939,883 | 6/60 | Punderson | 260—603 |

MAURICE A. BRINDISI, *Primary Examiner.*

JULIUS GREENWALD, *Examiner.*